United States Patent
Lu et al.

(10) Patent No.: US 9,241,308 B2
(45) Date of Patent: Jan. 19, 2016

(54) DISCONTINUOUS RECEPTION METHOD AND USER EQUIPMENT USING THE SAME

(71) Applicants: Qianxi Lu, Beijing (CN); Zhenshan Zhao, Beijing (CN)

(72) Inventors: Qianxi Lu, Beijing (CN); Zhenshan Zhao, Beijing (CN)

(73) Assignee: Telefonaktiebolaget L M Ericsson, Stockholm (SE)

( * ) Notice: Subject to any disclaimer, the term of this patent is extended or adjusted under 35 U.S.C. 154(b) by 275 days.

(21) Appl. No.: 13/697,035

(22) PCT Filed: Oct. 10, 2012

(86) PCT No.: PCT/CN2012/082692
§ 371 (c)(1),
(2) Date: Nov. 9, 2012

(87) PCT Pub. No.: WO2014/056154
PCT Pub. Date: Apr. 17, 2014

(65) Prior Publication Data
US 2014/0211673 A1   Jul. 31, 2014

(51) Int. Cl.
*H04W 52/02* (2009.01)
*H04W 76/04* (2009.01)

(52) U.S. Cl.
CPC ...... *H04W 52/0212* (2013.01); *H04W 52/0216* (2013.01); *H04W 52/0251* (2013.01); *H04W 76/048* (2013.01)

(58) Field of Classification Search
CPC .................. H04W 52/0251; H04W 72/04
USPC .................................. 370/412, 468
See application file for complete search history.

(56) References Cited

U.S. PATENT DOCUMENTS

| 2010/0238880 A1 | 9/2010 | Wu |
| 2010/0322173 A1 | 12/2010 | Marinier et al. |
| 2011/0002281 A1 | 1/2011 | Terry et al. |
| 2011/0026625 A1* | 2/2011 | Susitaival et al. ............ 375/260 |
| 2012/0140689 A1* | 6/2012 | Pelletier et al. ............ 370/311 |

FOREIGN PATENT DOCUMENTS

| EP | 2 148 542 | 1/2010 |
| EP | 2148542 A1 | 1/2010 |
| WO | WO 2011/085270 A1 | 7/2011 |

OTHER PUBLICATIONS

International Search Report for PCT Application No. PCT/CN2012/082692, mailed Jun. 13, 2013, 3 pages.
Written Opinion of the International Searching Authority for PCT Application No. PCT/CN2012/082692, mailed Jun. 13, 2013, 4 pages.

(Continued)

*Primary Examiner* — Mark Rinehart
*Assistant Examiner* — Matthew Hopkins
(74) *Attorney, Agent, or Firm* — Myers Bigel Sibley & Sajovec, P.A.

(57) ABSTRACT

The present application relates to a DRX method in a CoMP scenario. In one embodiment, the DRX method comprises steps of detecting a new transmission on a Physical Downlink Control Channel (PDCCH) of one of at least two Base Stations (BSs) each of which is serving the UE; and triggering a DRX thread for continuously monitoring the PDCCH of the one BS on which the new transmission is detected. There is also provided a user equipment using the DRX method.

24 Claims, 5 Drawing Sheets

(56) References Cited

OTHER PUBLICATIONS

3GPP TS 36.331 V11.0.0 (Jun. 2012); "3rd Generation Partnership Project; Technical Specification Group Radio Access Network; Evolved Universal Terrestrial Radio Access (E-UTRA); Radio Resource Control (RRC); Protocol specification (Release 11);" $3^{rd}$ Generation Partnership Project; 650 Route des Lucioles—Sophia Antipolis Valbonne—France; 302 pages.

3GPP TS 36.321 V11.0.0 (Sep. 2012); "3rd Generation Partnership Project; Technical Specification Group Radio Access Network; Evolved Universal Terrestrial Radio Access (E-UTRA); Medium Access Control (MAC) protocol specification (Release 11);" $3^{rd}$ Generation Partnership Project; 650 Route des Lucioles—Sophia Antipolis Valbonne—France; 55 pages.

Notification of Transmittal of International Preliminary Report on Patentability, for PCT Application No. PCT/CN2012/082692, mailed Jun. 25, 2015, 5 pages.

European Search Report Corresponding to Patent Application No. 12 88 6325; Dated: Nov. 6, 2015; 3 Pages.

\* cited by examiner

DISCONTINUOUS RECEPTION METHOD AND USER EQUIPMENT USING THE SAME

CROSS REFERENCE TO RELATED APPLICATION

This application is a 35 U.S.C. §371 national stage application of PCT International Application No. PCT/CN2012/082692, filed on 10 Oct. 2012, the disclosure and content of which is incorporated by reference herein in its entirety.

TECHNICAL FIELD

The present application relates to a Discontinuous Reception (DRX) method. In particular, the application relates to a DRX method and a User Equipment (UE) using the DRX method in a CoMP (Coordinated Multiple Points) scenario.

BACKGROUND

Unless otherwise indicated herein, the approaches described in this section are not prior art to the claims in this application and are not admitted to be prior art by inclusion in this section.

The $3^{rd}$ Generation Partnership Project (3GPP) is a globally applicable third generation mobile phone system specification that is a result of collaboration between various groups of telecommunications associations, including the European Telecommunications Standards Institute, the Association of Radio Industries and Businesses/Telecommunication Technology Committee (ARIB/TTC), China Communications Standards Association, and the Alliance for Telecommunications Industry Solutions. 3GPP work is ongoing with Universal Terrestrial Radio Access Network (UTRAN) long term evolution (LTE). The 3GPP RAN2 working group has defined a Discontinuous Reception (DRX) mechanism to save battery life and resources of user equipment (UE). The main principle in DRX is that the user equipment (UE) behavior is defined relative to the successful decoding of the Physical Downlink Control Channel (PDCCH) by the UE. When the UE is in DRX, the UE is allowed to stop monitoring the PDCCH temporarily. DRX uses one or two pre-defined cycles (long and/or short cycles), at the beginning of which the UE monitors the PDCCH over a certain amount of transmission time intervals (TTIs), according to an "On Duration" Timer. The PDCCH carries downlink (DL) assignments as well as uplink (UL) grants.

Whether the UE is awake (e.g., is monitoring the PDCCH) or asleep after the On Duration period, depends on activity (i.e., possible reception of PDCCH control data during the period). To avoid unnecessary scheduling and to avoid wasting of radio resources, the base station (e.g., eNodeB) should know the state of the UE when transmitting downlink data from the base station to the UE. Thus, a set of clear rules for changing from the active state to DRX and back are defined in Reference [1] (3GPP Technical Specification (TS) 36.321, "Medium Access Control (MAC) Specification," V10.1.0, March, 2011).

Figure 1:
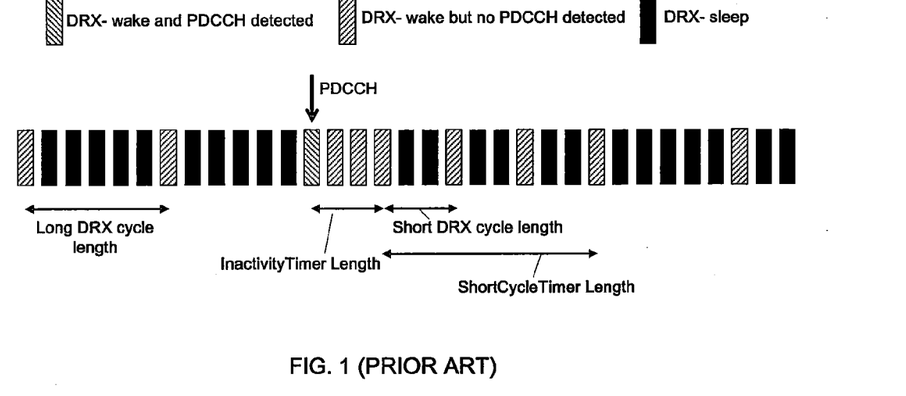
FIG. 1 illustrates a traditional DRX mechanism.

FIG. 1 illustrates a traditional DRX mechanism which includes a long DRX cycle and a short DRX cycle. The UE turns on its receivers to monitor scheduling information on PDCCH. If no transmission on the PDCCH is detected, i.e., the UE wakes but no transmission on the PDCCH is detected, the UE may turn off its receivers, i.e., go to sleep, to reduce battery consumption. After a sleep period, the UE again turns on its receivers to monitor the PDCCH. The cycle is called a Long DRX cycle. If a transmission on the PDCCH is detected at a time, i.e., the UE wakes and a transmission on the PDCCH is detected, the UE shall continuously monitor the PDCCH, i.e., an Inactivity Timer is started to extend the active time for monitoring the PDCCH. When the Inactivity Timer expires, a short DRX cycle is started, during which the UE wakes with a shorter sleep period than that sleep period used in the long DRX cycle. After the short DRX cycle, the UE enters the long DRX cycle. The DRX mode is important to increase the standby times of mobile devices such as small handsets.

Reference [1] also provides some other parameters, such as drx-Retransmission Timer, mac-Contention Resolution Timer, HARQ RTT Timer and others that used in the DRX mode. FIG. 1 does not show these parameters for simplicity.

Currently, the CoMP Work Item was approved in 3GPP RAN plenary #53 meeting. A UE in a CoMP scenario means that the UE is served by at least two Base Stations (BSs) at the same time. In the CoMP scenario, the at least two Base Stations (BSs) transmit scheduling information on separate (e)PDCCHs, and the UE shall monitor the separate (e)PDCCHs at the same time. The enhanced PDCCH (ePDCCH) is used to supplement, augment, or replace the PDCCH control channel. When two or more (e)PDCCHs are used, the (e)PDCCHs are allocated with different resource locations to avoid interference. For example, a conventional physical downlink control channel (PDCCH) is transmitted in a first region of a physical downlink control channel structure while an enhanced physical downlink control channel (ePDCCH) is transmitted in a second region of the physical downlink control channel.

There is a need for a new DRX method in the CoMP scenario.

SUMMARY

An object of the present application is to provide a DRX method in a CoMP scenario and a user equipment using the DRX method.

According to a first aspect, there is provided a Discontinuous Reception (DRX) method of a User Equipment (UE) in a DRX mode, comprising steps of detecting a new transmission on a Physical Downlink Control Channel (PDCCH) of one of at least two Base Stations (BSs) each of which is serving the UE; and triggering a DRX thread for continuously monitoring the PDCCH of the one BS on which the new transmission is detected.

Preferably, the DRX method further comprises receiving information on resource configuration of the PDCCHs of the at least two BSs to be detected via an RRC signaling during initial RRC establishment.

Preferably, the DRX further comprises receiving information on resource configuration of the PDCCHs of the at least two BSs to be detected when the UE enters an area served by the at least two BSs.

Preferably, the UE may apply one and the same set of DRX configuration parameters to the respective DRX threads of the at least two BSs.

Preferably, triggering a DRX thread comprises configuring an Inactivity Timer without a shortCycle Timer.

Preferably, triggering a DRX thread comprises configuring an Inactivity Timer and a shortCycle Timer as well.

Preferably, a first BS of the at least two BSs is a downlink serving node while a second BS of the at least two BSs is an uplink serving node.

Preferably, at least one of the following timers is disabled in the triggered DRX thread when the detected new transmission is from the second BS: HART RTT Timer; and drx-Retransmission Timer.

Preferably, the DRX method further comprises stopping continuous PDCCH monitoring after the UE transmits a zero Buffer Status Report (zero-BSR) to the second BS.

Preferably, the DRX method further comprises stopping continuous PDCCH monitoring when a pre-defined timer (840) expires after the UE transmits a zero Buffer Status Report (zero-BSR) to the second BS, the pre-defined timer being started when the UE transmits the zero-BSR to the second BS.

Preferably, the first BS has a higher transmission power than the second BS.

Preferably, downlink of the first BS is decoupled from uplink of the second BS.

Preferably, the PDCCH comprises an enhanced PDCCH (ePDCCH).

According to a second aspect, there is provided a User Equipment (UE) in a Discontinuous Reception (DRX) mode, comprising: a detection unit configured to detect a Physical Downlink Control Channel (PDCCH) of one of at least two Base Stations (BSs) each of which is serving the UE; and a DRX control unit configured to control DRX cycle of the UE, wherein the DRX control unit is configured to trigger a DRX thread for continuously monitoring a PDCCH when the detection unit detects a new transmission on that PDCCH.

Preferably, the UE may further comprises a resource configuration reception unit configured to receive information on resource configuration of the PDCCHs of the at least two BSs to be detected via an RRC signaling during initial RRC establishment.

Preferably, the UE may further comprises a resource configuration reception unit configured to receive information on resource configuration of the PDCCHs of the at least two BSs to be detected when the UE enters the area served by the at least two BSs.

Preferably, the DRX control unit is configured to apply one and the same set of DRX configuration parameters to the respective DRX threads of the at least two BSs.

Preferably, the DRX control unit is further configured to configure an Inactivity Timer without a shortCycle Timer when triggering the DRX thread.

Preferably, the DRX control unit is further configured to configure an Inactivity Timer and a shortCycle Timer as well when triggering the DRX thread.

Preferably, a first BS of the at least two BSs is a downlink serving node while a second BS of the at least two BSs is an uplink serving node.

Preferably, the DRX control unit is further configured to disable at least one of the following timers in the triggered DRX thread: HART RTT Timer; and drx-Retransmission Timer.

Preferably, the DRX control unit is further configured to stop continuous PDCCH monitoring after the UE transmits a zero Buffer Status Report (zero-BSR) to the second BS.

Preferably, the DRX control unit is further configured to stop continuous PDCCH monitoring when a pre-defined timer expires after the UE transmits a zero Buffer Status Report (zero-BSR) to the second BS, the pre-defined timer being started when the UE transmits the zero-BSR to the second BS.

According to embodiments of the present application, the present application has the following advantages:

Only one set of DRX configuration can be used to monitor (e)PDCCH from multiple BSs, such as Macro BS and Pico BS in a decoupled scenario.
The number of blind detection can be almost half reduced.
The computation complexity can be reduced.
The power of UE can be saved.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA and other networks. The terms "network" and "system" are often used interchangeably. The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Communication System

Figure 2:
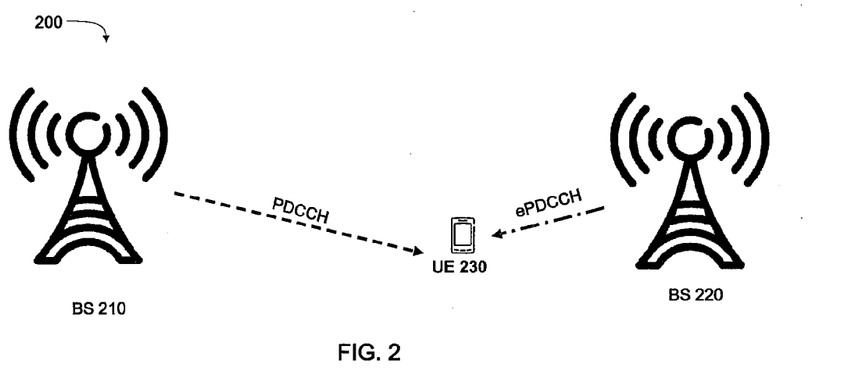
FIG. 2 illustrates a diagram of a wireless communication system where the present invention may be implemented.

Referring now to FIG. 2, a diagram of a wireless communication system 200 where the present invention may be implemented will be discussed. The wireless communication system 200 may include a number of evolved NodeBs (eNBs) and user equipments.

An eNB may be a station that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB.

The wireless communication system 200 may also include relay stations (not shown). A relay station is a station that receives a transmission of data and/or other information from an upstream station (e.g., an eNB or a UE) and sends a transmission of the data and/or other information to a downstream station (e.g., a UE or an eNB).

The UEs may be dispersed throughout the wireless communication system 200, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc.

For simplicity, only two Base Stations, BS 210 and BS 220, and one user equipment, UE 230, is shown in FIG. 2.

As shown, UE 230 is located in an area covered by BS 210 and BS 220 each of which is serving UE 230. As shown in FIG. 2, both BS 210 and BS 220 transmit scheduling information on a PDCCH to UE 230 to schedule it. For example, BS 210 uses a PDCCH while BS 220 uses an ePDCCH. The resource locations of the PDCCHs (PDCCH and ePDCCH) of the two BSs are different to avoid interference.

From the soft-cell perspective, BS 210 and BS 220 would be in the same cell in the UE point of view. According to the current 3GPP specification on DRX mode where no CoMP scenario is considered, the inactivity timer and shortCycle timer are triggered by a transmission on the PDCCH for the specific UE. That is, when the UE detects C-RNTI, TPC-PUCCH-RNTI, TPC-PUSCH-RNTI or Semi-Persistent Scheduling C-RNTI on the PDCCH, the inactivity timer and shortCycle timer are triggered to continuously monitor the PDCCH.

Figure 3:
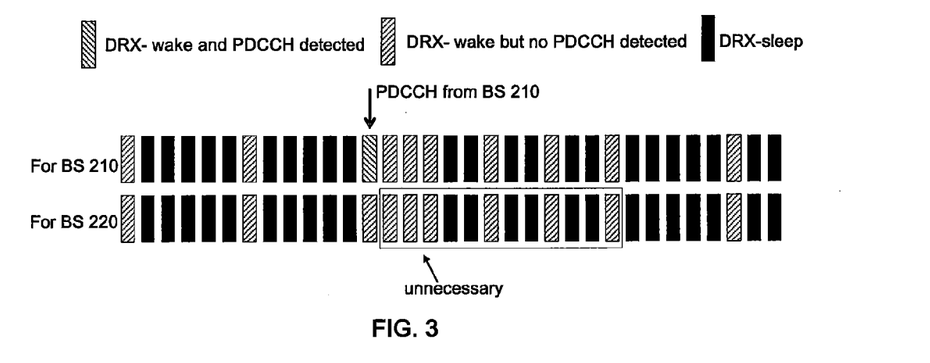
FIG. 3 shows a DRX mechanism obtained by directly applying the existing DRX mechanism in a wireless communication system as shown in FIG. 2.

FIG. 3 shows a DRX mechanism obtained by directly applying the existing DRX mechanism in a wireless communication system 200 as shown in FIG. 2. As shown in FIG. 3, when a transmission on PDCCH of BS 210 is detected, the UE will starts its inactivity timer and shortCycle timer to continuously monitor (e)PDCCHs of both BS 210 and BS 220. If the transmission on PDCCH of BS 210 is not coupled to the transmission on the ePDCCH of BS 202, the transmission on PDCCH of BS 210 does not mean an ePDCCH activity of BS 220, and vice versa. Furthermore, monitoring (e)PDCCH is power consuming. Accordingly, the continuous ePDCCH monitoring triggered accompanying with the transmission on PDCCH of BS 210 is unnecessary for the UE whose power is limited, which wastes the power of the UE.

Example DRX Operation

Figure 4:
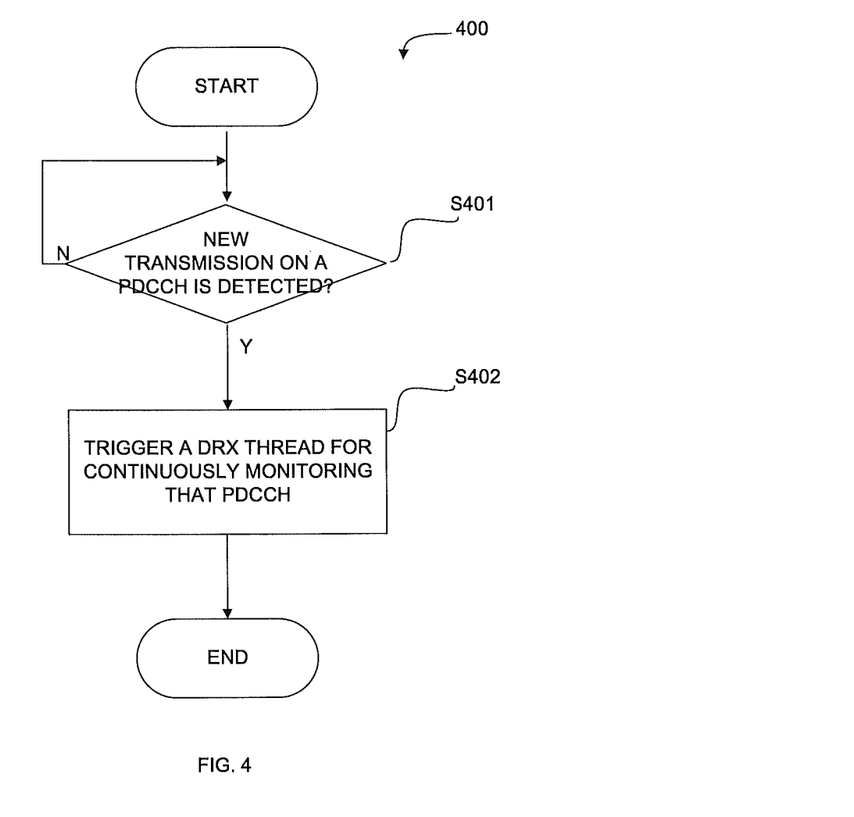
FIG. 4 illustrates a flowchart of a DRX method according to an embodiment of the present invention.

FIG. 4 illustrates a flowchart of a DRX method 400 according to an embodiment of the present invention. The method is applied to a UE in the wireless communication system 200 as shown in FIG. 2. As shown in FIG. 4, the method starts when the UE comes in the area covered by the two BSs, and the UE in a DRX mode detects transmission on any (e)PDCCH of BS 210 and BS 220 at step S401. If a new transmission on a (e)PDCCH of one BS is detected at step S401, for example, a transmission of PDCCH from BS 210 is detected, the method proceeds to step S402, where a DRX thread is triggered for monitoring that PDCCH on which the new transmission is detected.

Figure 5:
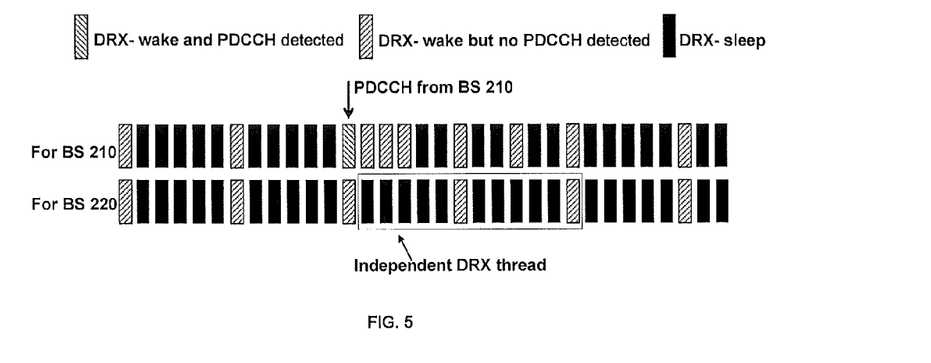
FIG. 5 shows a DRX mechanism obtained by applying the DRX method according to an embodiment of the present invention.

FIG. 5 shows a DRX mechanism obtained by applying the DRX method according to an embodiment of the present invention. At the beginning, no transmission on any (e)PDCCH is detected, and the UE is in a long DRX cycle, as in the traditional DRX mechanism. When the UE detects a new transmission on PDCCH from BS 210, a DRX thread is triggered, i.e., inactivity timer and shortCycle timer are started to continuously monitor the PDCCH of BS 210. At the same time, for the ePDCCH of BS 220, since no new transmission is detected, the UE stays in its long DRX cycle. That is, the DRX thread for the PDCCH of BS 210 is independent from that for the ePDCCH of BS 220. Similarly, if a new transmission on ePDCCH from BS 220 is detected instead (not shown in FIG. 5), the UE will start a DRX thread to continuously monitor the ePDCCH, while the DRX thread of the PDCCH remains unchanged.

By applying the DRX method according to the present invention in the wireless communication system as shown in FIG. 2, the UE will only continuously monitor a PDCCH on which a transmission has been detected, and stays in the long DRX cycle for other PDCCH(s) on which no transmission is detected, and thereby the power computation of the UE can be reduced.

Example Decoupled Scenario

Figure 6:
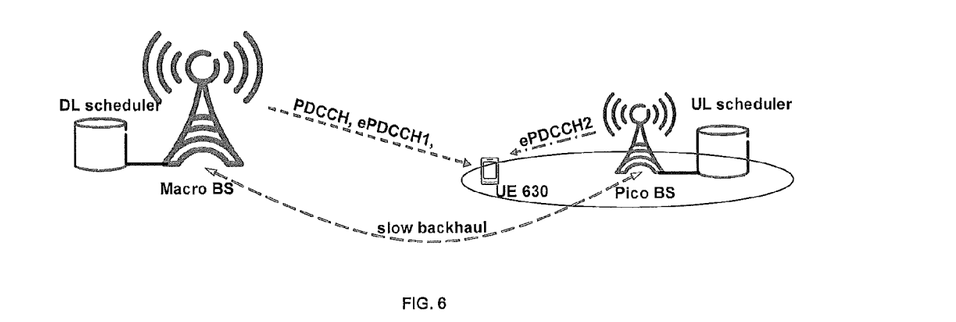
FIG. 6 illustrates a typical decoupled uplink and downlink scenario.

FIG. 6 illustrates a typical decoupled uplink and downlink scenario. As shown in FIG. 6, UE 630 is located in an area covered by a Macro cell and a Pico cell. As the Macro cell has a much higher transmission power than the Pico cell, the coverage is different for the Macro cell and the Pico cell. For UE 630 located in the macro cell coverage but at the boundary of the Pico cell, the received downlink signal from the macro cell is stronger than that from the Pico cell. Hence UE 630 is associated with the macro cell and receives downlink signals from the macro cell. For the uplink, since UE 630 is closer to the Pico cell than the Macro cell, it is better to select the Pico cell as the reception point, in order to reduce the transmission power of UE and the interference to other UEs in the Pico cell. Therefore, for UE 630, the Macro BS is the downlink serving node while the Pico BS is the uplink serving node. This is the so-called decoupled downlink/uplink scenario.

In the decoupled DL-UL scenario, if ANY backhaul connection (good, less than ~0.5 ms latency; medium, ~5 ms latency; any, ~50-100 ms latency) is considered, it is hard to support instantaneous information exchange between Macro BS and Pico BS, i.e., there is a need to implement DL/UL separation between Macro BS (DL) and Pico BS (UL). It could be implemented by, e.g., the Macro BS using PDCCH and/or ePDCCH1 for DL and the Pico BS using ePDCCH2 for UL on the resources reserved by Macro point to avoid severe interference, which is shown in FIG. 6.

Example DRX Operation in Decoupled Scenario

Figure 7:
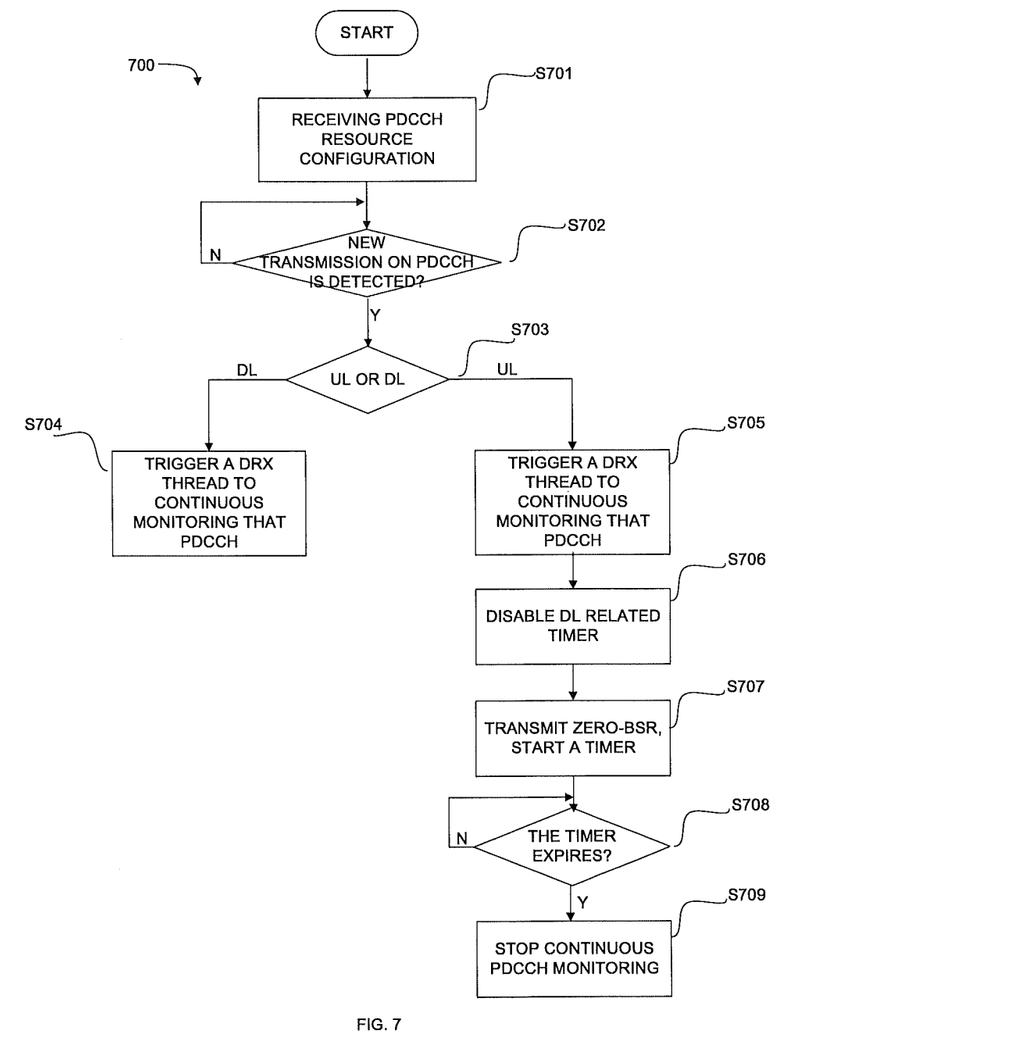
FIG. 7 illustrates a flowchart of a DRX method according to an embodiment of the present invention in the decoupled DL/UL scenario as shown in FIG. 6.

FIG. 7 illustrates a flowchart of a DRX method 700 according to an embodiment of the present invention in the decoupled DL/UL scenario as shown in FIG. 6. The method starts when UE 630 enters the decoupled area. There would be a RRC signalling from the network to the UE to notify that it works in a decoupled area now. UE 630 may receive information on resource configuration of the (e)PDCCHs of the Macro and Pico BSs at step S701. The information may piggyback on the RRC signalling transmitted when the UE enters the decoupled area. Alternatively, the UE may receive the information on resource configuration of the (e)PDCCHs of the Macro and Pico BSs via a RRC signalling during an initial RRC establishment stage. The UE then may detect transmission on (e)PDCCHs of both BSs at step S702. The (e)PDCCHs have different resource locations, and thus the UE can differentiate the (e)PDCCHs of different BSs. If a new transmission on a (e)PDCCH of one BS is detected at step S702, for example, a transmission of ePDCCH2 from the Pico BS is detected, the method proceeds to step S703, where the UE determines the detected PDCCH is from the Macro BS or from the Pico BS. If the detected transmission is on the PDCCH of the Macro BS, the method proceeds to step S704, where a DRX thread is trigged for continuously monitoring the PDCCH of the Macro BS. If it is determined that the detected transmission is from the Pico BS at step S703, the method proceeds to step S705, where a DRX thread is trigged for continuously monitoring the ePDCCH of the Pico BS.

In the DRX method 700, the UE may apply one and the same set of DRX configuration parameters to the respective DRX threads of the Macro and Pico BSs. That is, only one set of DRX configuration parameters is necessary to be transmitted to the UE by the network during RRC connection setup stage, e.g., in MAC-MainConfig RRC IE, which UE then stores the set of DRX configuration parameters, including for example the onDuration Timer, Inactivity Timer, shortCycle Timer, drx-Transmission Timer, mac-Contention Resolution Timer, HARQ RTT Timer and others in its storage. In the present disclosure, designations for the various timers are the same as defined in Reference [1] and the respective timers function in the same way as those with the same designations. In a most common case, the triggered DRX thread for the Macro BS is the same as the trigged DRX thread for the Pico BS. In other words, when a new transmission on a (e)PDCCH is detected, the UE is activated to continuously monitor the detected PDCCH as in the traditional DRX scheme, i.e., starting an Inactivity Timer and a shortCycle Timer, and also other appropriate timers. Accordingly, the UE will awake from the long DRX cycle and continuously monitor the detected (e)PDCCH, and then enter the short DRX cycle, and finally enter the long DRX cycle again when the Inactivity Timer and the shortCycle Timer expire. In an alternative embodiment, the UE does not configure the shortCycle Timer when triggering a DRX thread. In the embodiment, the UE will awake to continuously monitor the detected (e)PDCCH, and then immediately enter the long DRX cycle when the Inactivity Timer expires without a short DRX cycle.

Simplification may be implemented in the decoupled DL/UL scenario. On one hand, when triggering a DRX thread for continuously monitoring the PDCCH of the Macro BS which is the downlink serving node to the UE in step S704, the existing DRX timers, i.e., onDuration Timer, drx-Inactivity Timer, drx-Retransmission Timer, longDRX-CycleStart-Offset, shortDRX Cycle, and drxShortCycle Timer can be all applied. This is because the DL data is originated by the network, i.e., the Macro BS, and the UE is blind to the DL buffer status. The UE thus has to rely on the DRX to balance between latency and power consumption.

On the other hand, when triggering a DRX thread for continuously monitoring the ePDCCH of the Pico BS which is the uplink serving node to the UE in step S705, the DRX thread may be simplified to some extent because the UE is aware of the UL buffer status. For example, since no DL scheduling is expected on the detected ePDCCH, it is unnecessary to configure DL dedicated timers. Accordingly, at step S706, the UE disables DL related timers, including at least one of HART RTT Timer and drx-Retransmission Timer. Since the UL data is originated by the UE itself, the UE may immediately stop continuous ePDCCH monitoring, e.g., stop the Inactivity Timer and the possible shortCycle Timer and enter the long DRX cycle, after it transmits a zero Buffer Status Report (zero-BSR) to the Pico BS because the zero-BSR indicates that the UL buffer of the UE is empty and that the UE had no more data to be transmitted on the uplink. In such case, the HARQ re-transmission of the UE may continue independently to ensure the data is correctly transmitted. As an alternative embodiment, the UE transmits a zero-BSR to the Pico BS and starts a timer at step S707. The timer is an additional timer having a predefined time period in the UE. At step S708, it is determined whether the timer expires or not. When the timer expires, the UE stops continuous ePDCCH monitoring at step S709.

Moreover, if it is a transmission of ePDCCH of the Pico BS that is detected, the UE only needs to blind detect the DCI format related UL grant because only UL grant will be sent from the Pico BS. Accordingly, the complexity of computation and power consuming can be further reduced.

The method 700 described above may be performed by any suitable components or other means capable of performing the corresponding functions of FIG. 7. For example, method illustrated in FIG. 7 may be performed by components of a transmission point, such as a UE, illustrated below in FIG. 8.

Figure 8:
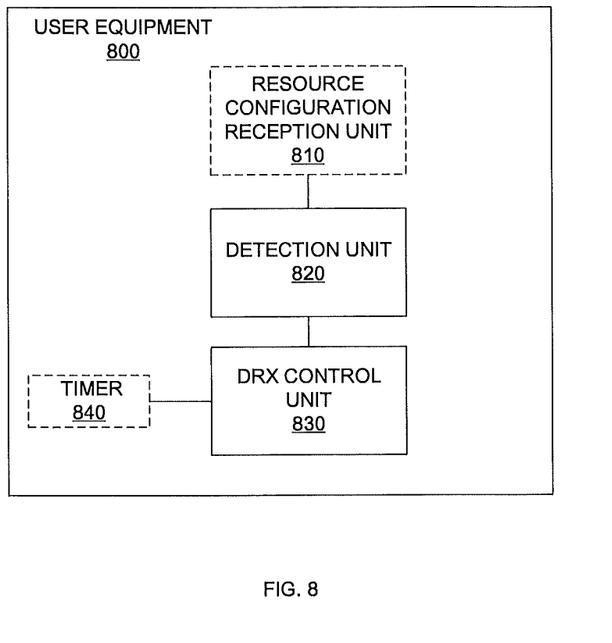
FIG. 8 illustrates a block diagram of a user equipment according to an embodiment of the present invention.

FIG. 8 illustrates a block diagram of a user equipment 800 according to an embodiment of the present invention. As shown in FIG. 8, UE 800 comprises a detection unit 802 and a DRX control unit 803. For a UE in a DRX mode, the detection unit 802 is configured to detect transmission on (e)PDCCH of the serving nodes. The DRX control unit 803 is configured to control the DRX cycle of UE 800. For a UE in a DRX mode, the DRX control unit 803 configures the appropriate DRX timers for discontinuously monitoring the (e)PDCCH of the serving nodes. When the detection unit 802 detects a new transmission on the (e)PDCCH of one serving node, the DRX control unit 803 triggers a DRX thread for continuously monitoring the (e)PDCCH on which the new transmission is detected.

UE 800 may further comprise a resource configuration reception unit 801 which is configured to receive information on resource configuration of the (e)PDCCHs of the serving nodes. The resource configuration reception unit 801 may receive the information in the RRC signalling which is transmitted when UE 800 enters the decoupled area. The RRC signalling is transmitted for notifying the UE that it works in a decoupled area now. Alternatively, the resource configuration reception unit 801 may receive the information via a RRC signalling during an initial RRC establishing stage. After knowing the resource locations of the (e)PDCCHs to be monitored, UE 800 may then detect transmission on the (e)PDCCHs by monitoring the (e)PDCCHs.

UE 800 may further comprise a storage (not shown in FIG. 8) for storing the DRX configuration parameters to be applied during the DRX mode. In an embodiment, UE 800 may store one set of DRX configuration parameters, and apply the one and same set of DRX configuration parameters to the respective DRX threads of the serving nodes since the DRX threads are separate from each other. In a most common case, when UE 800 enters the area as shown in FIG. 6, the DRX control unit 802 may be configured to apply the same DRX configuration parameters (e.g., the timers) to trigger a DRX thread for a Macro BS as triggering a DRX thread for a Pico BS. In other words, when the detection unit 802 detects a new transmission on a (e)PDCCH, the DRX control unit 803 is configured trigger a DRX thread for continuously monitoring the detected PDCCH as in the traditional DRX scheme, i.e., starting an Inactivity Timer and a shortCycle Timer, and also other appropriate timers. Accordingly, UE 800 will awake from the long DRX cycle and continuously monitor the detected (e)PDCCH, and then enter the short DRX cycle, and finally enter the long DRX cycle again when the Inactivity Timer and the shortCycle Timer expire. In an alternative embodiment, the DRX control unit 803 does not configure the shortCycle Timer when triggering a DRX thread. In the embodiment, UE 800 will awake to continuously monitor the detected (e)PDCCH, and then immediately enter the long DRX cycle when the Inactivity Timer expires without a short DRX cycle.

Simplification may be implemented in UE 800 which is within a decoupled DL/UL scenario. For example, the DRX control unit 803 is configured to apply the existing DRX timers, i.e., onDuration Timer, drx-Inactivity Timer, drx-Retransmission Timer, longDRX-CycleStartOffset, shortDRX Cycle, and drxShortCycle Timer, when triggering a DRX thread for continuously monitoring the PDCCH of the Macro BS which is the downlink serving node to the UE. The DRX control unit 803 is further configured to trigger a simplified DRX thread when triggering a DRX thread for continuously monitoring the PDCCH of the Pico BS which is the uplink serving node to the UE. The simplified DRX thread comprises disabling DL related timers, including at least one of HART RTT Timer and drx-Retransmission Timer. Moreover, the DRX control unit 803 may be configured to immediately stop continuous PDCCH monitoring, e.g., stop the Inactivity Timer and the possible shortCycle Timer and enter the long DRX cycle, after UE 800 transmits a zero Buffer Status Report (zero-BSR) to the Pico BS because the zero-BSR indicates that the UL buffer of the UE is empty. Alternatively, UE 800 may further comprise an additional timer 804 which is provided in addition to the existing DRX timers. The additional timer 804 is started when UE 800 transmits a zero-BSR to the Pico BS. The DRX control unit 803 is configured to stops continuous PDCCH monitoring when the timer 840 expires.

It should be noted that the user equipment 800 of FIG. 8 may include more or fewer elements than shown, in various arrangements, and the scope of the claimed subject matter is not limited in this respect.

According to foregoing embodiments of the present application, the present application has the following advantages:
Only one set of DRX configuration can be used to monitor (e)PDCCH from multiple BSs, such as Macro BS and Pico BS in a decoupled scenario.
The number of blind detection can be almost half reduced.
The computation complexity can be reduced.
The power of UE can be saved.

The foregoing description of implementations provides illustration and description, but is not intended to be exhaustive or to limit the invention to the precise form disclosed. Modifications and variations are possible in light of the above teachings, or may be acquired from practice of the invention. For example, while blocks have been described with regard to FIGS. 4 and 7 in a specific order, the order of the blocks may be modified in other implementations consistent with the principles of the invention. Further, non-dependent blocks may be performed in parallel.

Aspects of the present invention may also be implemented in methods and/or computer program products. Accordingly, the invention may be embodied in hardware and/or in hardware/software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. The actual software code or specialized control hardware used to implement embodiments described herein is not limiting of the invention. Thus, the operation and behaviour of the aspects were described without reference to the specific software code—it being understood that those skilled in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

ABBREVIATIONS

In the following, abbreviations used in the present invention are listed:
UE User Equipment
BS Base Station
UL Uplink
DL Downlink
3GPP 3$^{rd}$ Generation Partnership Project
eNB E-UTRAN Node B
LTE Long Term Evolution
PDCCH Physical Downlink Control Channel
ePDCCH enhanced PDCCH
CoMP Cooperated Multiple Points
UL-CoMP Uplink CoMP
DRX Discontinuous Reception
DCT Downlink Control Information
BSR Buffer Status Report
UTRAN Universal Terrestrial Radio Access Network

What is claimed is:

1. A Discontinuous Reception (DRX) method of a User Equipment (UE) in a DRX mode, the method comprising:
detecting a new transmission on a Physical Downlink Control Channel (PDCCH) of a first Base Station (BS) of at least two Base Stations (BSs), each of which is serving the UE; and
triggering a DRX thread performed by the UE for continuously monitoring the PDCCH of the first BS on which the new transmission is detected,
wherein the DRX thread performed by the UE for continuously monitoring the PDCCH of the first BS is independent from a thread performed by the UE for a ePDCCH of a second BS of the at least two BSs,
wherein the UE is served by the first BS of the at least two BSs that is a downlink serving node and by a second BS of the at least two BSs that is an uplink serving node, and wherein a downlink of the first BS is decoupled from an uplink of the second BS.

2. The DRX method of claim 1, further comprising:
receiving information on resource configuration of the PDCCHs of the at least two BSs to be detected via an RRC signaling during initial RRC establishment.

3. The DRX method of claim 1, further comprising:
receiving information on resource configuration of the PDCCHs of the at least two BSs to be detected, in response to the UE entering an area served by the at least two BSs.

4. The DRX method of claim 2, further comprising the UE applying one and the same set of DRX configuration parameters to the respective DRX threads of the at least two BSs.

5. The DRX method of claim 2, further comprising:
starting an Inactivity Timer, without starting a shortCycle Timer, in response to the triggering the DRX thread.

6. The DRX method of claim 2, further comprising:
starting an Inactivity Timer and starting a shortCycle Timer in response to the triggering the DRX thread.

7. The DRX method of claim 1, further comprising disabling at least one of the following timers in the triggered DRX thread in response to the detected new transmission being from the second BS: HART RTT Timer; or drx-Retransmission Timer.

8. The DRX method of claim 1, further comprising: stopping the continuous monitoring of the PDCCH in response to the UE transmitting a zero Buffer Status Report (zero-BSR) to the second BS.

9. The DRX method of claim 1, further comprising: starting a predefined timer in response to the UE transmitting a zero Buffer Status Report (zero-BSR) to the second BS; and
stopping the continuous monitoring of the PDCCH when the pre-defined timer expires.

10. The DRX method of claim 1, wherein the UE is served by the first BS having a higher transmission power than the second BS.

11. The DRX method of claim 1, wherein the triggering a DRX thread comprises applying an onDuration Timer, an DRX-Inactivity Timer, an DRX-Retransmission Timer, an longDRX-CycleStartOffset, an shortDRX Cycle, and an DRXShortCycle Timer.

12. The DRX method of claim 1, wherein the PDCCH comprises an enhanced PDCCH (ePDCCH).

13. A User Equipment (UE) operating in a Discontinuous Reception (DRX) mode, comprising:
a detection unit configured to detect a new transmission on a Physical Downlink Control Channel (PDCCH) of a first Base Station (BS) of at least two Base Stations (BSs) each of which is serving the UE; and
a DRX control unit configured to control DRX cycle of the UE, wherein the DRX control unit is configured to trigger a DRX thread performed by the UE for continuously monitoring the PDCCH in response to detection of the new transmission on the PDCCH,
wherein the DRX thread performed by the UE for continuously monitoring the PDCCH of the first BS is independent from a thread performed by the UE for a ePDCCH of a second BS of the at least two BSs,
wherein the UE is served by the first BS of the at least two BSs that is a downlink serving node and by a second BS of the at least two BSs that is an uplink serving node, and
wherein a downlink of the first BS is decoupled from an uplink of the second BS.

14. The UE of claim 13, further comprising:
a resource configuration reception unit configured to receive information on resource configuration of the PDCCHs of the at least two BSs to be detected via an RRC signaling during initial RRC establishment.

15. The UE of claim 13, further comprising:
a resource configuration reception unit configured to receive information on resource configuration of the PDCCHs of the at least two BSs to be detected, in response to the UE entering the area served by the at least two BSs.

16. The UE of claim 14, wherein the DRX control unit is configured to apply one and the same set of DRX configuration parameters to the respective DRX threads of the at least two BSs.

17. The UE of claim 14, wherein the DRX control unit starts an Inactivity Timer without starting a shortCycle Timer in response to the trigger of the DRX thread.

18. The UE of claim 14, wherein the DRX control unit starts an Inactivity Timer and starts a shortCycle Timer in response to the trigger of the DRX thread.

19. The UE of claim 13, wherein the DRX control unit is further configured to disable at least one of the following timers in the triggered DRX thread in response to the detection unit detecting the new transmission being from the second BS:
HART RTT Timer; or
drx-Retransmission Timer.

20. The UE of claim 13, wherein the DRX control unit is further configured to stop the continuous monitoring of the PDCCH in response to the UE transmitting a zero Buffer Status Report (zero-BSR) to the second BS.

21. The UE of claim 13, wherein the DRX control unit is further configured to start a predefined timer in response to the UE transmitting a zero Buffer Status Report (zero-BSR) to the second BS, and to stop the continuous monitoring of the PDCCH when the pre-defined timer expires.

22. The UE of claim 13, wherein the UE is served by the first BS having a higher transmission power than the second BS.

23. The UE of claim 13, wherein the PDCCH comprises an enhanced PDCCH (ePDCCH).

24. The UE of claim 13, wherein the trigger of the DRX thread comprises applying an onDuration Timer, an DRX-Inactivity Timer, an DRX-Retransmission Timer, an longDRX-CycleStartOffset, an shortDRX Cycle, and an DRXShortCycle Timer.

* * * * *

UNITED STATES PATENT AND TRADEMARK OFFICE
CERTIFICATE OF CORRECTION

PATENT NO. : 9,241,308 B2  
APPLICATION NO. : 13/697035  
DATED : January 19, 2016  
INVENTOR(S) : Lu et al.

Page 1 of 1

It is certified that error appears in the above-identified patent and that said Letters Patent is hereby corrected as shown below:

Claims

In Column 11, Line 50, in Claim 13, delete "(BSs)" and insert -- (BSs), --, therefor.

Signed and Sealed this
Seventh Day of June, 2016

Michelle K. Lee
*Director of the United States Patent and Trademark Office*